June 22, 1965     F. S. FLICK     3,190,702
SEALING STRUCTURE FOR PISTON AND CYLINDER DEVICE
Filed May 23, 1961

Inventor:
Francis S. Flick
By: Hofgren, Brady, Wegner,
Allen & Wellman
Attorneys United States Patent Office 3,190,702
Patented June 22, 1965

3,190,702
SEALING STRUCTURE FOR PISTON AND
CYLINDER DEVICE
Francis S. Flick, Oak Park, Ill., assignor to Flick-Reedy Corporation, a corporation of Illinois
Filed May 23, 1961, Ser. No. 112,090
7 Claims. (Cl. 308—3.5)

This invention relates to a sealing structure for piston and cylinder device. More specifically, the invention has to do with an accurate seal having both dynamic and static sealing portions for use in machine tool grade piston and cylinder devices.

The primary object of this invention is to provide a new and improved sealing structure.

Another object is to provide a seal between relatively moving parts in a piston and cylinder device in which the seal is confined in a cavity in metallic parts from which the seal cannot move during service.

Another object is to provide a new and improved seal and bushing which will positively maintain the heel of the seal in a position preventing any interference with the operation of the dynamic sealing lip of the seal.

Another object is to provide a seal structure which is subject to less distortion when pressure is applied in service so that the seal remains stable in its initial assembled proper position.

Another object is to provide a seal structure having novel parts positively positioning the seal at its heel in order to obtain a better seal under adverse conditions.

Other objects, features and advantages of the present invention will be apparent from the following description of a preferred embodiment illustrated in the accompanying drawings, in which.

Figure 1:
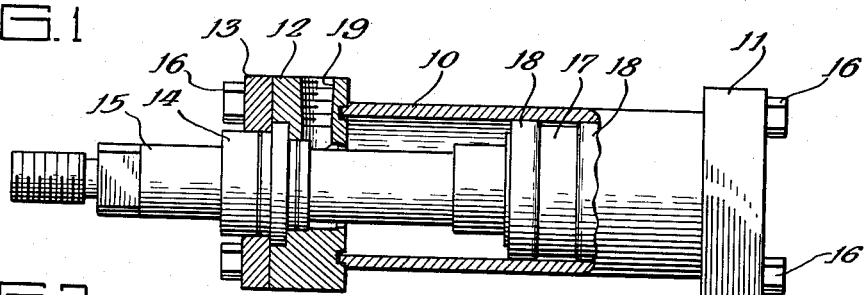
FIGURE 1 is a side elevational view partly in section and partly broken away of the machine tool grade piston and cylinder device incorporating the invention.

In the embodiment chosen for purposes of illustration, the present sealing structure is shown as a part of the rod seal in the head of the cylinder through which the piston rod reciprocates. Referring particularly to FIGURE 1, a cylinder having a barrel 10 is equipped with a cap 11 at one end and a head 12 at the other end closing the cylinder. The head has a retainer plate 13 holding a piston rod bushing 14 in place around the reciprocating piston rod 15, the assembly being maintained by tie rods with nuts 16 thereon holding the heads and cylinder in assembly. A piston 17 is mounted upon the inner end of the piston rod 15 and is equipped with seals 18 at either side preventing the flow of fluid past the piston, such as may be pumped into or out of the cylinder through appropriate ports 19 in the head and a similar port (not shown) in the cap 11. The present novel seal structure may be used in conjunction with the piston or the rod bushing 14 to seal the piston to the cylinder or the interior from the exterior of the cylinder around the rod during its reciprocation.

Figure 2:
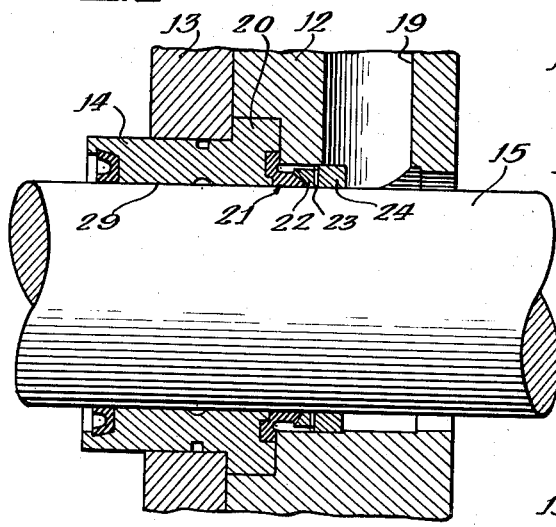
FIGURE 2 is a fragmentary much enlarged view taken through the head of the cylinder shown in FIGURE 1, showing the sealing structure in section.

Referring particularly to FIGURE 2, the parts of the seal are shown as they are assembled. The rod seal is associated with the bushing 14 which provides a bearing surface 29 for the piston rod 15. The bearing bushing for the rod also has an outer flange 20 which abuts the head 12 in metal to metal bearing relation and is held in that position by the retainer plate 13. This metal to metal contact between the piston rod bushing and the head of the cylinder is intended to form a cavity for the reception of the base of a resilient seal 21. The shape of the bushing and the shape of the resilient seal are both important to the operation of the present invention.

In the assembly of FIGURE 2 the resilient annular seal 21 is shown as having a lip portion with its extremity in contact with the piston rod surface. The extremity of the seal is maintained in hydraulic cylinders in contact with the piston rods by a follower ring 22 pressed toward the lip of the seal by a wave spring 23 bearing inwardly against an inner bushing 24 mounted in an appropriate notch in the central bore in the head of the cylinder. The parts of the head, bushing and resilient seal are so formed that the seal must stay in its assembled position even under the influence of temperature rise, pressure, friction or any volumetric changes which may occur for any operating condition within the cylinder. In air or other pneumatic cylinders, the wave spring, inner bushing and pressure rings may be omitted and the seal lip portion will contact the rod under its own resiliency.

Figure 3:
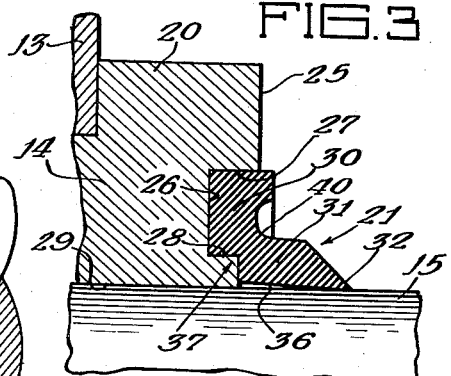
FIGURE 3 is a still greater enlarged fragmentary sectional view showing a radial section through the bushing and seal and the piston rod prior to assembly in the cylinder.
Figures 5, 6:
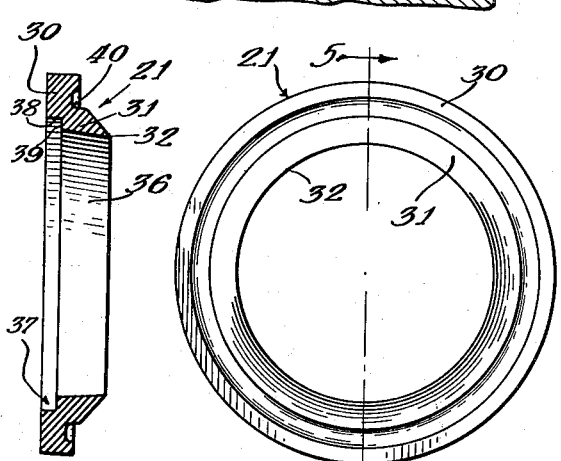
FIGURE 5 is a medial sectional view through the resilient sealing ring employed with seal structure, taken substantially along line 5—5 in FIGURE 6.
FIGURE 6 is a plan view of the resilient seal structure shown in FIGURE 5.

The particular form of the bushing and resilient seal are shown in FIGURE 3 prior to assembly in the cylinder. The bushing flange portion 20 has a radial inner end surface 25 intended to abut the head 12 of the cylinder. A recess is formed in the inner end of the bushing, this recess having primarily three walls into which the base of the seal is intended to seat. The bottom wall 26 is generally radial of the piston rod and the outer cylindrical wall 27 and shorter inner cylindrical wall 28 are generally parallel and concentric with the inner bearing surface 29 of the bushing. The relatively short inner wall 28 of the recess forms a shoulder upon which the heel portion at the juncture of the base and lip portions of the resilient seal is intended to be seated. The seal may be formed of many different materials, some of which may be rubber-like, plastic, leather or other suitable materials. Preferably a resilient material is used. The seal itself as shown in FIGURES 3, 5 and 6 has primarily a base portion 30 and a lip portion 31 substantially at right angles to each other. The lip portion 31 has an extremity 32 intended to have sealing contact with the periphery of the piston rod. At the juncture of the lip and base portion is the heel of the seal which seats upon the shoulder surface 28. When the seal is out of the assembly so that the resilient material is without stress, the thickness of the base portion exceeds the maximum depth of the recess in the bushing as shown in FIGURE 3. When the bushing is drawn up into the head and into the metal to metal contact with the head of the cylinder, the base portion of the seal is reduced in its longitudinal dimension forming a static seal when it is clamped into place. This static seal condition is illustrated in FIGURE 4.

The assembly of the seal in the cylinder effects both a static and dynamic seal. In FIGURE 4, the bushing 14 is in contact with the head so that the base portion 30 of the seal is squeezed between the bottom surface 26 of the recess and the head surface 35 forming a static seal between the bottom of the recess and the head. The lip portion is in contact with the piston rod and is held there by the follower ring 22. A wave spring 23 presses against an inner bushing 24 to urge the ring 22 against the lip portion. It may be noticed that the lip portion is out of contact with the rod near the heel. The seal has an inner surface 36 extending from the lip portion generally along the rod but out of contact with the rod at the heel. The seal itself is provided with an annular step 37 (FIGURE 5) at the heel intended to seat upon the shoulder 28. The step 37 has two surfaces 38 and 39 substantially at right angles and in effect in cross-section appears as a right-angle notch in the juncture of the lip and base portions of the seal. This seating of the heel upon the shoulder provides a metallic part of the bushing holding the seal heel out of contact with the rod. Under such conditions, the lip of the seal may properly engage the piston rod and produce a leak-proof operation.

The shoulder 28 in the end of the bushing serves additional functions. The base of the seal is practically surrounded by metal and the sides of the cavity can be accurately controlled in manufacture so that the base of the seal will always be held in the same position. The effective length of the base which may be expanded under temperature conditions is actually the part of the seal from the shoulder 28 toward the piston rod 15 and is very short in comparison with the total volume of the base portion 30 of the seal. Under such conditions, the base is held in the cavity and will not move under any of the conditions of pressure and temperature changes which may occur during operation. Ordinarily, there is more variation in the size of molded seals than will occur in accurately made, machined metal parts. In the present invention, the cavity in which the seal is to be placed is surrounded by metal and therefore quite accurate from one cylinder to another and the inaccuracies which may occur in the molded seals do not affect the ultimate seal seating position in the cylinder. The shoulder 28 performs the additional function of piloting the seal into proper place within the cylinder. The shoulder engaging the step at the heel of the seal pilots the seal so that it is concentric with the rod and the extremity of the lip will always contact the rod under such conditions.

Figure 4:
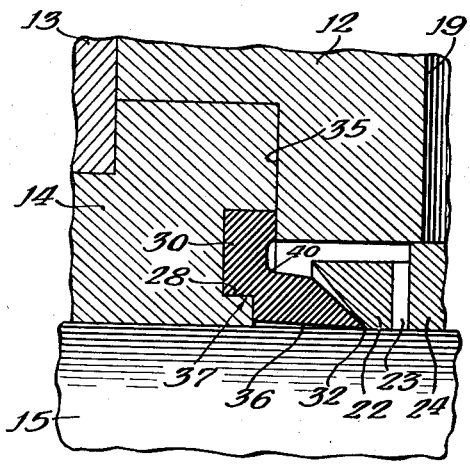
FIGURE 4 is a view similar to FIGURE 3 showing the seal structure after assembly in the cylinder.

The step in the seal base at the juncture of the lip and base portion also provides a relatively narrow section or reduced neck portion from the step across to the opposite surface marked 40 in FIGURES 3, 4 and 5. This narrow section permits the lip portion of the seal to maintain its flexure toward the rod holding the extremity 32 into contact with the rod. The base is accurately held and tightly held so that the cantilever arm of the lip portion may be quite short. This aids the seal material in contacting the rod properly and forces which may be exerted upon the lip portion do not have the tendency of pulling the base out of the cavity. When pressure is applied within the cylinder, the seal is subject to very little distortion. In the past some seals have actually been distorted out of shape under pressure conditions and moved from their initial assembly position. The present seal remains in hydraulic balance under the influence of the hydraulic pressure within the cylinder. The base of the seal extremity is a static seal between the bushing and the head and the balance of the seal structure is under the influence of fluid pressure balanced around all parts of the seal. There is no tendency, therefore, to blow the seal out of place. The present bushing and seal structure may be placed in standard cylinders manufactured prior to the present invention since the bushing and seal sizes are so chosen as to fit the cavities existing in previously manufactured cylinders.

The foregoing detailed description has been given for clearness of understanding only, and no unnecessary limitations should be understood therefrom, as some modifications may be obvious to those skilled in the art.

I claim:

1. In a piston and cylinder device, a piston rod seal structure, comprising: an annular piston rod bushing having an inner cylindrical bearing surface for supporting a piston rod during reciprocation therethrough, said bushing having an annular recess in its inner end with inner and outer surfaces generally concentric with said bearing surface and being a part of said bushing; an annular resilient one-piece seal having a lip portion extending along the piston rod with its extremity in sealing contact with the piston rod and a base portion extending generally radially therefrom for seating in said recess in the bushing, said base portion extremity being adapted to be clamped between the head of the cylinder and said bushing in static sealing relation therebetween with said bushing and head abutting, said seal having a heel at the juncture of said lip and base portions with an annular step therein for seating upon the inner surface of said bushing recess, said inner surface being spaced from the piston rod a distance to maintain the heel of the seal out of contact with the piston rod and said base portion confined in said recess during operation of the piston and cylinder device.

2. In a piston and cylinder device, a piston rod seal structure, comprising: an annular piston rod bushing having an inner cylindrical bearing surface for supporting a piston rod during reciprocation therethrough, said bushing having a recess in its inner end with inner and outer surfaces generally concentric with said bearing surface and being surfaces on said bushing; an annular resilient one-piece seal having a lip portion extending along the piston rod with its extremity in sealing contact with the piston rod and a base portion extending generally radially therefrom for seating in said recess in the bushing, said base portion extremity being adapted to be clamped and squeezed between the head of the cylinder and said bushing in static sealing relation therebetween, said bushing having a metallic ring portion along said piston rod positioned radially opposite a portion of said recess for receiving the base portion of the resilient seal, said seal base portion extending into said recess radially opposite said metallic ring portion whereby the bushing locks the base portion of the seal in the cavity when assembled in the cylinder.

3. In a piston and cylinder device, an annular piston rod seal for sealing between a head of the cylinder and a piston rod reciprocable therethrough, comprising: an annular metallic bushing having an inner cylindrical bearing surface for supporting a piston rod during reciprocation and an inner end extending outwardly from said bearing surface, said bushing having a recess extending into its inner end forming an annular outwardly facing shoulder spaced radially outwardly and generally parallel to said bearing surface, a cylinder head opposed to and in abutting contact with the bushing and overlying a portion of said recess in the bushing forming a cavity therewith for receiving the base of a resilient seal in said recess; and an annular one-piece resilient seal having a lip portion extending generally along the piston rod with its extremity in sealing contact therewith, and a base portion extending generally radially of the lip portion into said cavity, said base portion having a thickness exceeding the size of said cavity so as to be squeezed in said cavity, said seal having a heel at the juncture of said base portion and lip portion to seat upon said annular shoulder in the bushing to maintain a spaced relation between the heel of said seal and the piston rod, when the base of the seal is in operative position confined in said recess and cavity in the piston and cylinder device.

4. In a piston and cylinder device, an annular seal for sealing between relatively reciprocating parts, comprising: a metallic member having an annular surface for guiding said parts in said reciprocation, said member having an annular portion extending longitudinally in the direction of reciprocation and having a shoulder adjacent but spaced from said annular surface; a clamping member opposed to said metallic member and forming a finite cavity therewith for receiving a resilient seal, said clamping member facially abutting said metallic member and said resilient seal along a line generally perpendicular to the axis of the reciprocating parts; and an annular resilient one-piece seal having a lip portion extending longitudinally in the direction of said reciprocation for sealing between the relatively movable parts, and a base portion extending generally radially therefrom into said cavity, said base having a heel at the junction of said lip portion and base portion with a step at the heel seated on said shoulder, said shoulder holding the base of the seal within said cavity and the heel of the seal away from the relatively reciprocating surface sealingly engaged by the sealing lip portion.

5. In a piston and cylinder device, a piston rod bushing and seal structure, comprising: an annular metallic bushing having an inner cylindrical bearing surface for supporting a piston rod during reciprocation therethrough, said bushing having an annular recess in its inner end, surfaces of said bushing forming inner and outer surfaces of the recess and being generally concentric with said bearing surface; a clamping member opposed to said bushing member and forming a finite cavity therewith for sealing a resilient seal, said clamping member overhanging said cavity to facially abut said metallic member and said resilient seal so that said resilient seal may be retained in a finite cavity; a resilient one-piece seal having an annular lip portion for extending along the piston rod and an annular base generally normal to the lip portion and of a size for seating in said bushing annular recess, said seal having an annular heel provided with a step to seat upon the inner surface of said recess, said inner recess surface forming a shoulder adjacent the bushing bearing surface for seating the heel of said seal and maintaining the heel out of contact with the piston rod.

6. In a piston and cylinder device, a piston rod bushing and seal structure, comprising: an annular metallic bushing having an inner cylindrical bearing surface for supporting a piston rod during reciprocation therethrough, said bushing having an annular recess in its inner end, surfaces of said bushing forming inner and outer surfaces of the recess and being generally concentric with said bearing surface, a resilient one-piece seal having an annular lip portion for extending along the piston rod and an annular base generally normal to the lip portion and of a size for seating in said bushing annular recess, said seal having an annular heel provided with a step to seat upon the inner surface of said recess, said inner recess surface forming a shoulder adjacent the bushing bearing surface for seating the heel of said seal and maintaining the heel out of contact with the piston rod, and an outer flange on said bushing forming the outer side of said recess and providing a radial end surface adapted to abut a head of a cylinder to confine and squeeze the base portion of the resilient seal against the head in static sealing relation therewith.

7. In a piston and cylinder device, a piston rod seal structure, comprising: an annular resilient one-piece seal member having a lip portion and a base portion forming generally an L-shaped section, said seal portions being generally at right angles to each other and having a heel portion at the juncture of said lip portion and said base portion, said heel having an annular step in said juncture, and said base portion provided with an annular radial end surface adapted to abut a clamping member and having an annular reduced section adjacent said radial end surface extending inwardly thereof and opposite said heel portion to provide a reduced neck portion thereof, said lip portion having an inner surface adapted to extend about a piston rod, the extremity thereof in contact with the rod and the remainder of said surface being slightly spaced from the rod, said annular step being adapted to seat upon the metallic member to hold said seal off of said rod to maintain said remainder surface in spaced relation to the rod.

References Cited by the Examiner

UNITED STATES PATENTS

| | | | |
|---|---|---|---|
| 1,292,524 | 1/19 | Serrell | 277—187 X |
| 2,489,769 | 11/49 | Flick | 308—3.5 |
| 2,509,151 | 5/50 | Kasten | 277—187 X |
| 3,013,826 | 12/61 | Sharp | 277—124 X |

FOREIGN PATENTS

| | | |
|---|---|---|
| 686,095 | 1/53 | Great Britain. |
| 716,544 | 10/54 | Great Britain. |

ROBERT C. RIORDON, *Primary Examiner.*

FRANK SUSKO, R. A. DOUGLAS, *Examiners.*